(12) United States Patent
Nicholson

(10) Patent No.: US 11,523,250 B1
(45) Date of Patent: Dec. 6, 2022

(54) COMPUTER SYSTEM WITH FEATURES FOR DETERMINING RELIABLE LOCATION DATA USING MESSAGES WITH UNRELIABLE LOCATION DATA

(71) Applicant: Valassis Digital Corp., Morrisville, NC (US)

(72) Inventor: Patrick Nicholson, Durham, NC (US)

(73) Assignee: Valassis Digital Corp., San Antonio, TX (US)

( * ) Notice: Subject to any disclaimer, the term of this patent is extended or adjusted under 35 U.S.C. 154(b) by 27 days.

(21) Appl. No.: 17/318,604

(22) Filed: May 12, 2021

(51) Int. Cl.
| | | |
|---|---|---|
| *H04W 4/021* | (2018.01) | |
| *H04W 64/00* | (2009.01) | |
| *G06K 9/62* | (2022.01) | |
| *H04L 9/06* | (2006.01) | |
| *H04L 61/5007* | (2022.01) | |

(52) U.S. Cl.
CPC .......... *H04W 4/022* (2013.01); *G06K 9/6218* (2013.01); *H04L 9/0643* (2013.01); *H04L 61/5007* (2022.05); *H04W 64/003* (2013.01)

(58) Field of Classification Search
CPC ............... H04W 4/022; H04W 64/003; G06K 9/6218; H04L 9/0643; H04L 61/5007
USPC ......................... 455/414.1–414.2, 456.1–457
See application file for complete search history.

(56) References Cited

U.S. PATENT DOCUMENTS

| | | | | |
|---|---|---|---|---|
| 9,191,916 | B1 * | 11/2015 | Jones | H04W 64/003 |
| 2005/0250516 | A1 * | 11/2005 | Shim | H04W 8/18 |
| | | | | 455/456.6 |
| 2014/0274154 | A1 * | 9/2014 | Rana | H04W 8/08 |
| | | | | 455/456.3 |
| 2017/0116224 | A1 * | 4/2017 | Qi | G06F 16/9535 |
| 2017/0359697 | A1 * | 12/2017 | Bhatti | H04W 4/30 |

* cited by examiner

*Primary Examiner* — Michael Y Mapa
(74) *Attorney, Agent, or Firm* — Fish & Richardson P.C.

(57) ABSTRACT

Reliable location data is found using messages with unreliable location data. A logistic-geohash is found for a plurality of messages. Records of are accessed data messages, each data message including a geographic locator and a sender-identifier. For each sender-identifier, one or more geogroups are determined. For each geogroup: determining, a representative point of the geogroup is found to represent the geogroup. Using the representative point of the geogroup, a geogroup-geohash is found. Pair of geogroup: logistic address are found based on a matching of at least some of the first plurality of digits and some of the second plurality of digits. For each pair of geogroup:logistic address, a distance is determined between the representative point of the geogroup and the representative point of the logistic address. Geogroup:logistic address pairs are selected. The selected geogroup:logistic address pairs are stored in memory as representing a logistic location of the sender-identifier.

20 Claims, 5 Drawing Sheets

COMPUTER SYSTEM WITH FEATURES FOR DETERMINING RELIABLE LOCATION DATA USING MESSAGES WITH UNRELIABLE LOCATION DATA

TECHNICAL FIELD

This document describes techniques for determining geolocations of the origins of data messages

BACKGROUND

In computing, geolocation includes techniques for determining geographic position of clients connected to a network and transmitting data. When clients send data, they often do not explicitly provide their geographic location in their messages and other clients on the network can use one or more processes or services to attempt to determine the geographic location of the client.

SUMMARY

Geolocation techniques are often error prone, not repeatable, and do not always identify the party of interest (e.g., they may identify locations of devices without identifying that a single user or application is using both devices at different times and in different places.) This document describes technology that is capable of ingesting this unreliable geolocation data and of producing more reliable geolocation data that is connected with resolved identities or entities and real-world, also known as logistic, addresses such as street addresses, building identifiers, geographic shapes or features, or trade zones.

Broadly speaking, this technology collects data about messages from the same party, or resolved identity or entity, referred to throughout this application as a digital household, and performs operations to harvest reliable geolocation data from the unreliable geolocation data. This is done by mapping message geolocation to geographic area, finding statistical patterns that indicate locations of regular communication, and finding corresponding real-world locations with those regular communication while excluding outlier locations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of determining reliable location data using messages with unreliable location data. The method includes determining, for each of a plurality of logistic addresses using a representative point of the logistic address, a logistic-geohash that may include a first plurality of digits, the digits being arranged in sequence identifying progressively more granular geographic areas. The method also includes accessing records of data messages, each data message including a geographic locator and a sender-identifier. The method also includes for each sender-identifier determining one or more geogroups, each geogroup identifying data messages originating near each other geographically. The method also includes for each geogroup:determining a representative point of the geogroup to represent the geogroup. The method also includes determining, using the representative point of the geogroup, a geogroup-geohash that may include a second plurality of digits, the digits being arranged in sequence identifying progressively more granular geographic areas identifying pairs of geogroup:logistic address based on a matching of at least some of the first plurality of digits and some of the second plurality of digits. The method also includes for each pair of geogroup:logistic address, determining a distance between the representative point of the geogroup and the representative point of the logistic address. The method also includes selecting one or more of the geogroup:logistic address pairs. The method also includes and storing in computer memory, for later access, the selected geogroup:logistic address pairs as representing a logistic location of the sender-identifier of the messages of the geogroup. Other embodiments of this aspect include corresponding computer systems, apparatus, and computer programs recorded on one or more computer storage devices, each configured to perform the actions of the methods.

Implementations may include one or more of the following features. The sender-identifier is one of the group may include internet protocol (ip) address, digital household identifier, and user identifier. Determining the geogroups may include identifying connected components in a graph created using geographic locators as vertices and distances between geographic locators as edges. The graph is assembled using only geographic locators within a threshold distance of a landmark. Determining the geogroups may include identifying clusters using a clustering analysis. The representative points of geogroups are centroids of a shape containing the geographic locators of the corresponding identified data messages. The centroids are found using a marginal median analysis. The logistic address is one of the group may include a mailing address, a building identifier, and a land parcel identifier. Identifying pairs of geogroup: logistic address based on a matching of at least some of the first plurality of digits and some of the second plurality of digits may include: generating a result table by joining a first table and a second table on n most significant digits in geohashes, the geohashes may include more than n digits; the first data table may include entries that each record at least a logistic address and an associated logistic-geohash; and the second data table may include entries that each record at least a geogroup identifier and an associated geogroup-geohash. The method may include initiating a computational process for a user associated with a particular sender-identifier using at least one of the selected geogroup: logistic address pairs as representing a logistic location of the sender-identifier of the messages of the geogroup. Implementations of the described techniques may include hardware, a method or process, or computer software on a computer-accessible medium.

In this document, technology is described that improves the operations of a computer as a machine. This technology can allow for higher precision data to be harvested even when input data is, due to technical limitations, inconsistent, error prone, and unreliable. This technology can advantageously apply geolocation to a resolved identity or entity (e.g., a digital household or user) that is more meaningful than just a single client or simple internet protocol (IP) address. As such, this technology can be used to perform computing operations that rely on geolocation with greater accuracy and confidence. In one example, advertising utility may be increased because the technology can be used to prune out ads for a user that are not geographically relevant. In one example, a user may send a request from a restaurant but, due to technical limitations, that message may be geolocated to a different location in a book store. This technology can advantageously allow the service of an ad relevant to the restaurant, where ad service without this technology may instead offer an ad related to book stores which would have lower salience for the user. In another example, computer security can be improved. Accurate geolocation of a digital household can allow a location-restricted service to be provided even in light of erroneous geolocation data of a particular message due to technological limitations. In one example, a user may sign up for a media streaming service that is limited to their country. The user's computing device, their so-called digital household, may be recorded as being geolocated in that country where the media may be streamed to. Later, the user may begin streaming the service, and a technological limitation may misidentify the location of the user based on a single message, the request for the media stream. However, with use of this technology, the streaming service may properly provide the stream based on the more accurate records of geolocation provided for by this technology.

Other features, aspects and potential advantages will be apparent from the accompanying description and figures.

DESCRIPTION OF DRAWINGS

Like reference symbols in the various drawings indicate like elements

DETAILED DESCRIPTION

This document described technology that determines reliable location data using messages with unreliable location data. Received messages can include or be tagged with unreliable location data. Patterns in this unreliable location data are found using statistical and analytical computer processes in order to identify a signal of reliable location data in the noise of the unreliable location data. This reliable location data can then be used for the provisioning of services.

Figure 1:
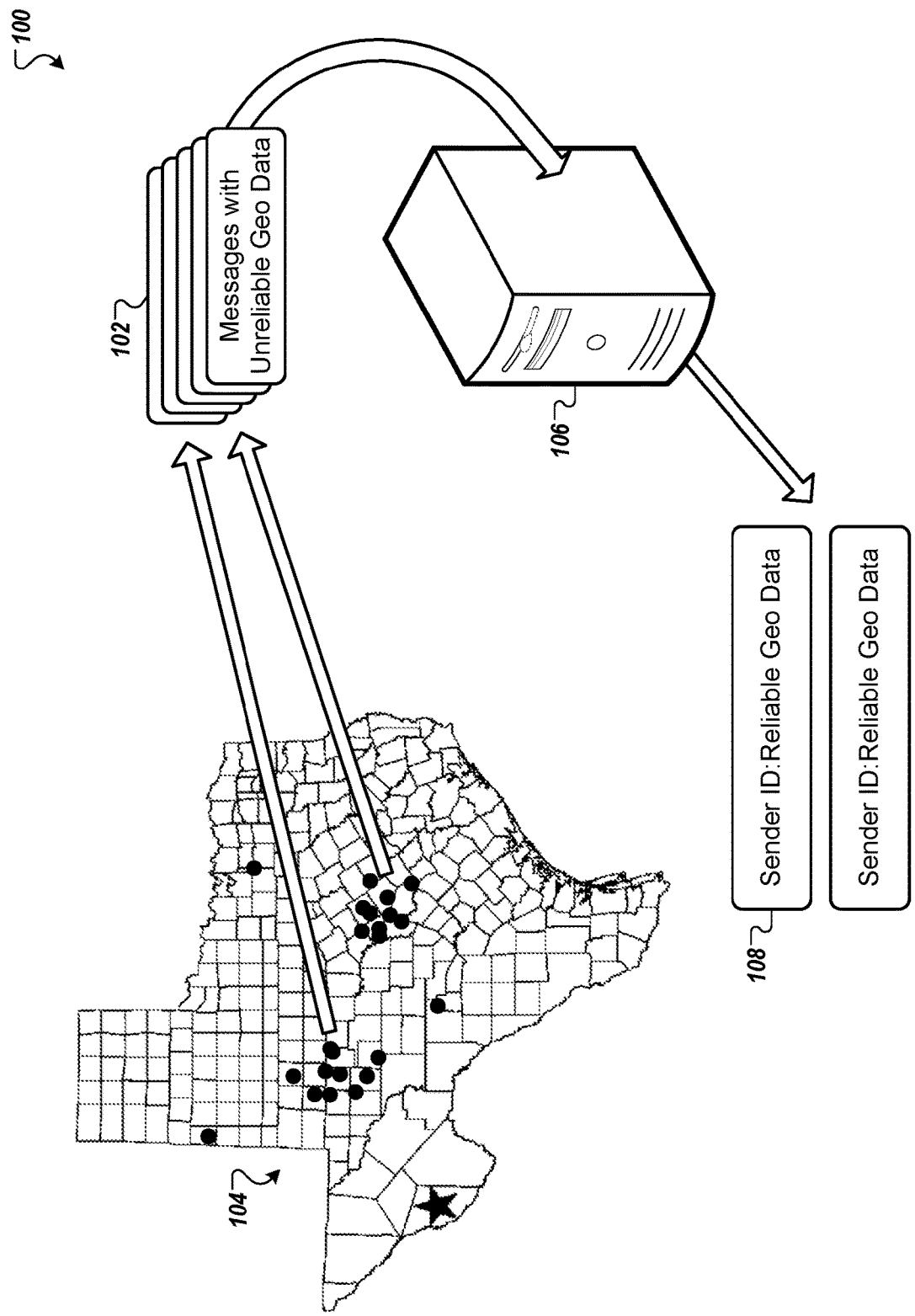
FIG. 1 shows an example system for generating reliable geolocation data.

FIG. 1 shows an example system 100 for generating reliable geolocation data. In the system 100, data messages 102 are received with geographic locators that map to various points 104 of geography. A computer system analyzes the data messages 102 and produces reliable geographic data 108 for various senders.

For clarity, this example shows data messages 102 from a few points 104 around a single state. However, it will be appreciated that in practice, the system 100 can produce thousands, millions, billions, or more messages 102 a day from thousands, millions, or more senders. In one example, the system may produce and handle approximately 30 billion messages 102 from approximately 100 million IP addresses. Due to the configuration of the technology of the system 100, increased message volume can scale quickly without overtaxing computational resources that can be economically deployed. On the low end, however, this technology can also handle situations in which particular senders send only very few messages. In fact, in some examples, the system 100 can produce useable results for a sender sending only two messages 102 total.

These data messages 102 may be explicitly contain geolocation data, or may contain other data that implicitly provides geolocation data. For example, the IP addresses of the messages may be tagged with geolocation by a geolocation service that provide unreliable geolocation data. While the messages 102 in fact were sent from two locations, the points 104 show that this unreliable location data can in fact map to some places around the true location, and can also map some messages to outlier locations that are far enough away from the true location to make provisioning of services for the user impossible or of lower quality.

However, the computer system 106 can be configured to decorate and analyze the messages 102 so that reliable geolocation data 108 can be determined. As can be seen in FIG. 1, enough of the unreliable geolocations map to two rough areas, and the computer 106 is able to identify and catalog those areas for use.

With the reliable geolocation data 108, the computer system 106 or other systems can perform operation that use location information for a user, device, etc. For example, documents relevant to a user's context can be served, and by incorporating location into the context, the most relevant documents can be served. In one example, the documents may be advertisements, and the user may be provided with advertisements that, based on user location, fit with the user's context. A user that lives near a state park and that works in a business district can be provided with advertisements for outdoor recreation items like backpacks and with advertisements for business services like courier services. Meanwhile, a user spending large amounts of time on a college campus can be provided with advertisements for tutoring services near the end of a semester and advertisements for discount airfare at the end of the semester when they may be traveling home or on vacation. As described, the context for the user may include data other than the reliable geolocation data 108 such as seasonality, past interactions with advertisements, etc. It will be understood, though, that while advertisement service primarily described in this document, this is for clarity only and a wide variety of other processes and services can be used with this technology.

Figure 2:
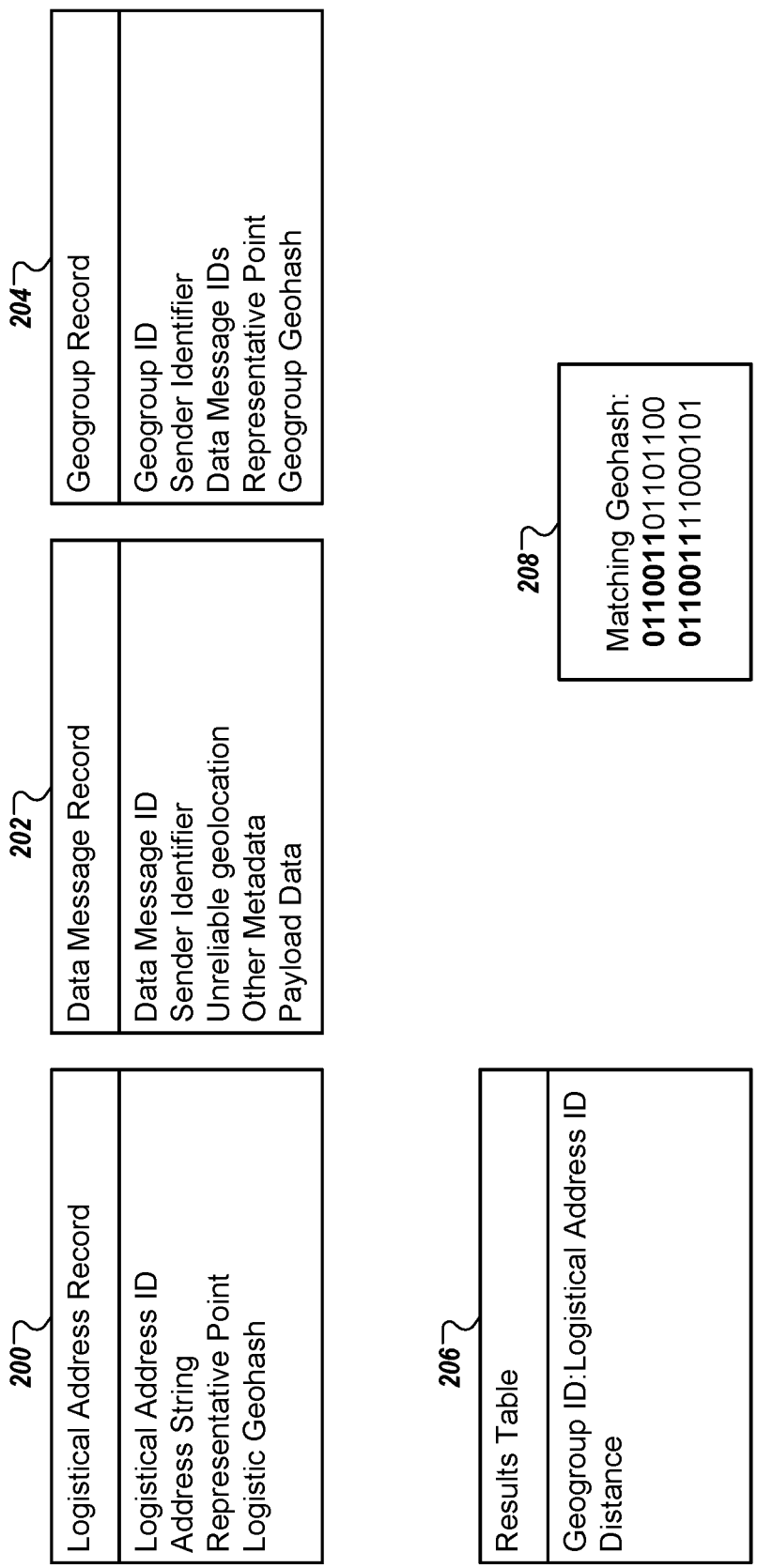
FIG. 2 shows data that can be used by computer systems determining reliable geolocation data.

FIG. 2 shows data that can be used by computer systems determining reliable geolocation data. Data 200-206 is shown as fields in single records of structured data. As will be understood, computer systems can store records in a variety of formats, depending on technical considerations such as storage size, access speed and cost, compressibility, etc. In many cases, computer systems store records in tables that can be visualized as a two-dimensional table with a column for each field and a row for each record such as a relational database. For this reason, for clarity, this description will use the example of such tables, but it will be appreciated that other logical formats of data architecture can be similarly used. Further, while this example shows a particular number and kind of data structures and fields, it will be appreciated that other numbers and kinds of data structures can be used. For example, each structure may contain other data and metadata useful for other operations than those for determining reliable location data using messages with unreliable location data.

A logistic address record 200 can record data related to logistic addresses. Logistic addresses are data that identify location in geography. These can include, but are not limited to, mailing addresses, a building identifier, and a land parcel identifier. This can include official first-class mailing addresses in the form of 123 Street Rd, Town, State, ZIP.

This can include proprietary designations in a supply chain for various warehouses, fulfilment centers, retail locations, etc. This can include parcels of land identified by official deed recorded by government record keepers for purposes such as parcel tax identifiers. In some cases, the logistic address may be a privacy-preserving data construct that is not tied to a particular person, device, or group. For example, an area may be partitioned into a group of arbitrary shapes (e.g., a square grid, a hexagonal grid) and the logistic addresses may uniquely identify one of those shapes. In many cases, though not all, users can use logistic address information to navigate from one physical space to another. For example, a user can drive from one street address to another, a truck can bring a package from a warehouse to a distribution center, etc.

The data 200 can be uniquely identified with a logistic address ID. The data 200 can record a human-readable or otherwise friendly-format name in an address string (e.g., "123 Street Rd, Town, State, ZIP" or "DistroCenter 123"). The data 200 can include a representative point that defines a single point for use in point-based, as opposed to area-based, analysis of the logistic address. The data 200 can include a logistic geohash of the representative point that comprises a first plurality of digits, the digits being arranged in sequence identifying progressively more granular geographic areas. That is, the geohash may encode a geographic location into a short string of data such as binary data. This data is hierarchical spatial data structure which subdivides space into buckets of grid shape. In one scheme, the first binary digit may specify a grid position of either negative 90° to 0° or 0° to positive 90° degrees of longitude or latitude. The next digit can specify a point in the lower half or upper half of this range, repeating with greater granularity each time. As such, each geohash may include two words of binary data, one for longitude and one for latitude, but other schemes of geohash are possible.

A data message record 202 can store data related to a single message received from a single sender (e.g., client) by a single destination (e.g., server). The data 202 can be uniquely identified with a data message ID. A sender identifier can identify one or more entities associated with the sending of the message. This sender identifier can include a single user, a user group, a single device identifier, and/or an identifier of a group of devices (e.g., the various devices owned by a particular user or family, all devices owned by a particular enterprise). Example sender identifiers include, but are not limited to, internet protocol (IP) address, digital household identifier, and user identifier. In some cases, the sender identifier 202 is provided by the message itself as explicit data or metadata. In some other cases, the sender identifier 202 is not explicitly included in the message and is added later. For example, the computer system generating useful results with the data 202 can add the sender identifier. In another example, an intermediary data-processor can create the sender identifier so that the sender identifier data is available when the message is received. The particular format and contents of the sender identifier can vary based on the technological environment and permissions of the data. For example, when user privacy is a concern, the sender identifier may be structured in a way that excludes sensitive data, that prevents mapping sender identifier to legal name, that prevents finding technological or social relationships between sender identifiers, etc. When greater interoperability is a concern, the sender identifier could include network addresses of a device, etc. The data 202 can include unreliable geolocation data that was explicitly recorded in the data message, or was decorated by another system analyzing the data message. The data 202 can also include other metadata and payload data that was in the message. This can include instructions to another process for any purpose—accessing data, requesting authentication, transmitting a text message, load data for a game, etc.

A geogroup record 204 records data for a geogroup. The geogroups identify data messages that originated near each other for a given sender identifier (see data 202). For example, a user who often accesses network functions at home and in an office may have two geogroup records 204 with their sender identifier, one geogroup record 204 for their home location and one for their office location. The geogroup records 204 can be uniquely identified with a geogroup ID, and may also store a single sender identifier and a large number of data message ID, though other formats are possible such as breaking the data message IDs out into another record. The geogroup record 204 can include a representative point that defines a single point for use in point-based, as opposed to area-based, analysis of the geogroup, as well as a geogroup hash of the representative point in the same data format as the logistic geohash (see data 200).

The representative point in the geogroup record can be generated by a computer system based on analysis of the data message records and logistic address records, as will be described elsewhere in this document.

A results table 206 can record geogroup:logistic address pairs and a measure of distance between logistic address 200 representative point and the geogroup record 204 representative point.

Data 208 shows two words of binary data in geohashes that match on N most significant digits, in this case with N=7. As shown in bold, the left-most seven binary digits match, and then subsequent binary digits do not match. Because the geohashes are hierarchical, the matching of the most significant digits indicate that the two corresponding points are relatively close to each other, with an N that can be selected based on technological need of a given task for which this document's technology is used.

Figure 3:
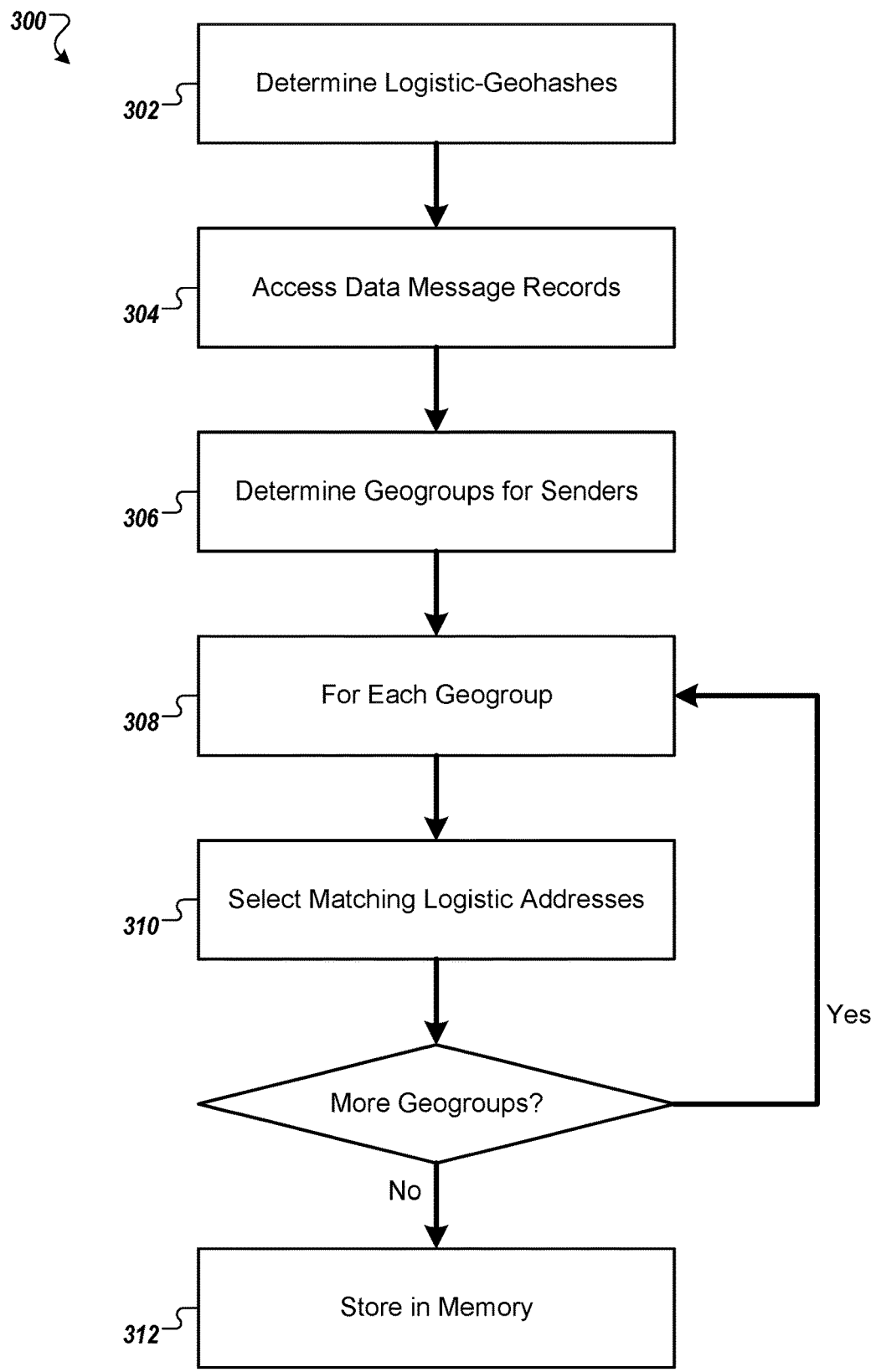
FIGS. 3 and 4 show example processes for determining reliable geolocation data.
Figure 4:
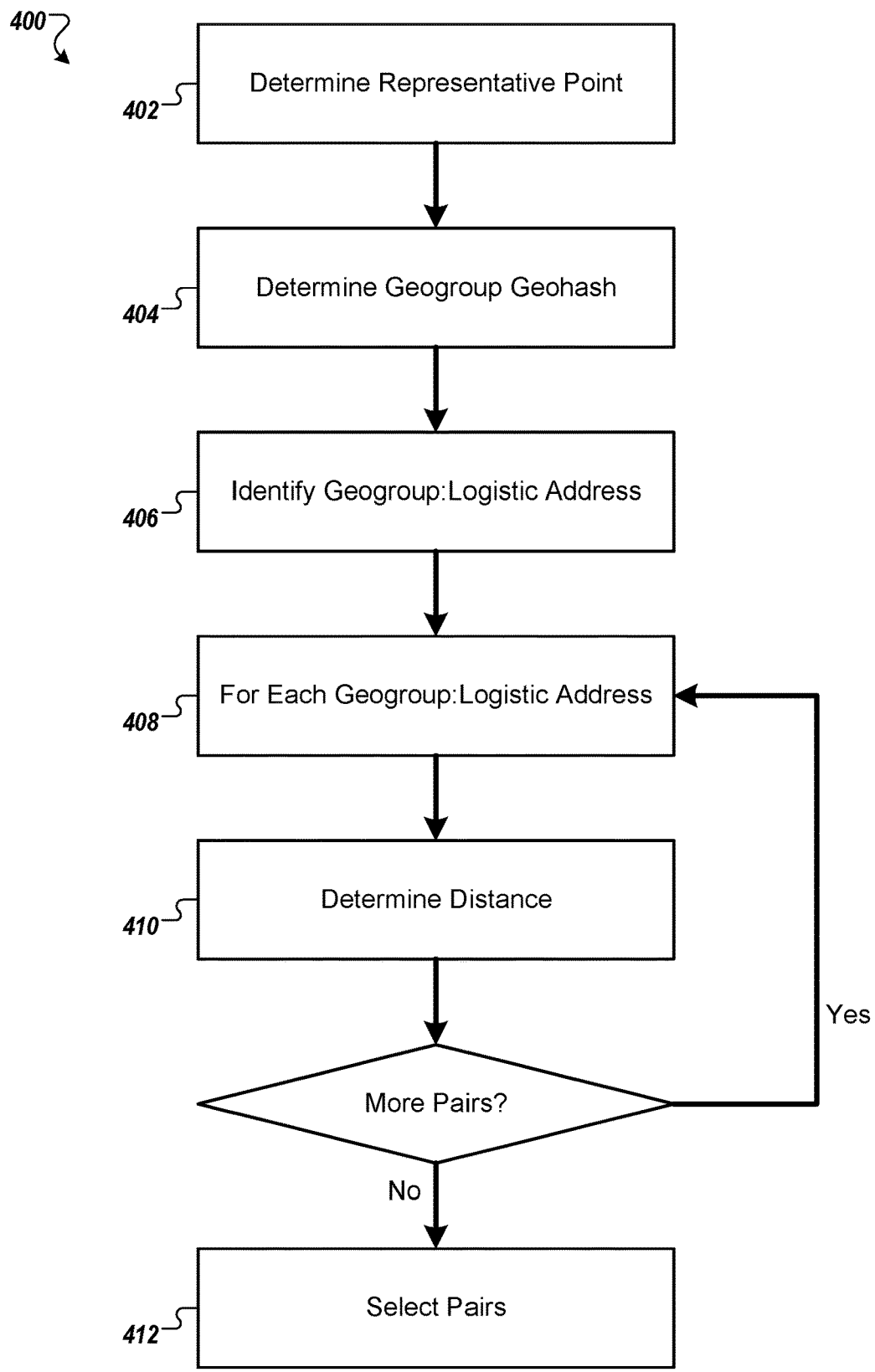

FIGS. 3 and 4 show example processes 300 and 400 for determining reliable geolocation data. In the process 300, a computer system uses unreliable data locations to determine reliable location data. The process 300 can be performed, for example, by a computer system with one or more processors and computer memory.

Records of data messages are accessed 302. Each data message includes a geographic locator and a sender-identifier. For example, the computer system log messages in data message records 202 as the messages are received over time. Then, for example when a critical mass of records 202 exist or on a periodic schedule or in response to a user request, the computer system can access the data 202 202 to perform the process 300.

For each sender-identifier, one or more geogroups are determined 304. For example, the computer system can assemble the geogroup records 204 for a given sender identifier to record and identify data messages originating near each other geographically. In some cases, this can involve a clustering or aggregating process that examines all or some of the data records 202 for members in a set that meet a particular definition of near each other.

In one example, determining the geogroups comprises identifying connected components in a graph created using geographic locators as vertices and distances between geographic locators as edges. For example, the computer system may create one vertex for each record 202. Then, the computer can examine each vertex in turn, calculating a distance to each other vertex based on the unreliable geolocation data, and store as an edge that distance. As will be understood, such a process may produce a fully connected graph, and the computer system may be configured to remove after creation, or exclude before creation, some of the edges. For example, if a vertex is greater than a threshold distance from a particular landmark (e.g., another unreliable geolocation, the set of logistic address 200 representative points), the edge or edges for the point may be excluded In another example, determining the geogroups comprises identifying clusters using clustering analysis. For example, the geohashes of the unreliable geolocations can be created and a hierarchical clustering may be performed to assign points to clusters based on grids defined by the geohashes. In another example, a centroid model such as k-means analysis may be used to identify k clusters in which each unreliable geolocation belongs to the cluster with the nearest cluster centroid. However, other clustering operations may be used.

For each geogroup 308, matching logistic addresses are selected 310. One example of this process will be described in the process 400 below, though other processes are possible.

The selected geogroup:logistic address pairs are stored in memory for later access as representing a logistic location of the sender-identifier of the messages of the geogroup 312. For example, each geogroup may be paired with one or more logistic addresses. Later, when a message is received with a particular sender identifier, the computer system can use the data 204, 206, and 200 to determine one or more logistic addresses for the sender identifier, and that logistic address can be provided to the subsystems responsible for responding to the request. This can include imitating a computational process for a user associated with a particular sender-identifier using at least one of the selected geogroup:logistic address pairs as representing a logistic location of the sender-identifier of the messages of the geogroup. For example, data can be stored or served, an automated process can begin to engage a computer-controlled machine, a third party can be communicated with through an electronic communication channel, etc.

This can allow for computational processes with greater accuracy for both a user of the process and a provider of a process. When serving documents or other forms of data, this technology can improve relevance of the document to the user. This is advantageous for the user, who is able to receive personalized, specific, or otherwise more important documents. This is also advantageous for the document provider, as they can expect this user, and other users being served in the same way, to appreciate and value the documents more than otherwise. This can allow for more goodwill with users for the providers, the ability to charge a higher fee reflecting the greater use, and/or avoid the overhead of serving useless documents.

In the process 400, a computer system matching logistic addresses for a subgroup (see process 300). The process 400 can be performed, for example, by a computer system with one or more processors and computer memory, including the computer system that performs the process 300.

A representative point of the geogroup is determined to represent the geogroup 402. For example, the various unreliable geolocations of the data 202 associated with the geogroup record 204 may be analyzed and a single point may be found based on those unreliable geolocations. In some cases, the representative points of geogroups are centroids of a shape containing the geographic locators of the corresponding identified data messages. For example, a centroid of the unreliable geolocations can be found using a marginal median analysis. In another example, one of the unreliable geolocation may be selected as the representative point of the geogroup. This selection may be a random select, may be a selection of the modal location seen most often, etc.

A geogroup-geohash is determined using the representative point of the geogroup 404. The geogroup-geohash comprises a second plurality of digits, the digits being arranged in sequence identifying progressively more granular geographic areas. As such, the geogroup-geohashes and the logistic-geohashes may have the same data format, allowing for direct comparisons of significant digits to meaningfully identify geographic nearness.

Pairs of geogroup:logistic address are identified based on a matching of at least some of the first plurality of digits and some of the second plurality of digits 406. For example, a matching (see data 208) of geohashes may be found. This can include generating the result table 206. The computer system can do so by joining a table of geogroup records 204 with a table of logistic address records 202, defining a match when the N most significant digits in geohashes match. In such cases, the geohashes can include more than N digits, allowing for matches of hashes that are geographically near, but not identical.

For each pair of geogroup:logistic address 408, a distance between the representative point of the geogroup and the representative point of the logistic address is determined 410. For example, a distance function may receive, as input, the representative point of a record 204 and a representative point of a record 200 and return, as output, a distance value. The distance function may use, for example, the Haversine formula, though other, potentially less accurate, measures of distance such as Euclidean distance may be used.

One or more of the geogroup:logistic address pairs is selected 412. For example, the computer system can access all entries in the results table and deduplicate any duplicate entries. With a collection of unique entries for a given geogroup, the entries can be sorted by distance, and one or more of the entries with the shortest distance may be selected. For example, the entry with the shortest distance may be found. For example, the M entries with the M shortest distances may be found. For example, a set of entries having the best combination of recall and precision (e.g., F-score) may be found. For example, an expected recall can be calculated as a cumulative distribution at the distance of the next pair. Then expected precision can be calculated at the recall over the number of distances at or below the pair ranks, and those that meet a minimum threshold may be selected.

One example process for finding the set of entries with the best F-score is described here, though it will be appreciated that other processes are possible. Statistical data about a geogroups can be determined by a computer system. For example, the computer system may apply a Gaussian mixture model in which an integral of the model's frequency distribution over different candidate geographic shapes. The computer system may then use the integral and/or data derived with the integral to generate the F-score.

In performing this, an oracle (e.g., a data source capable of producing output in response to an input request) can produce all possible logistic addresses available to be used as candidate logistic addresses. Then, candidate distances from candidate centroids to candidate addresses can be found. These candidate distances can be sorted in order of value, the model is applied to the distances, and then the application is shifted by one (i.e. the result of the model at the second closest distance is applied to the closest distance).

However, other types of shapes than those described here are possible. In such cases, some of the options described here are modified to account for this difference. For example, for computer systems can use shapes that are larger or more irregularly shaped than logistic addresses (e.g., geographic features, political boundaries, contiguous logistic addresses sharing elevation level), the integral can be evaluated in a different way.

Figure 5:
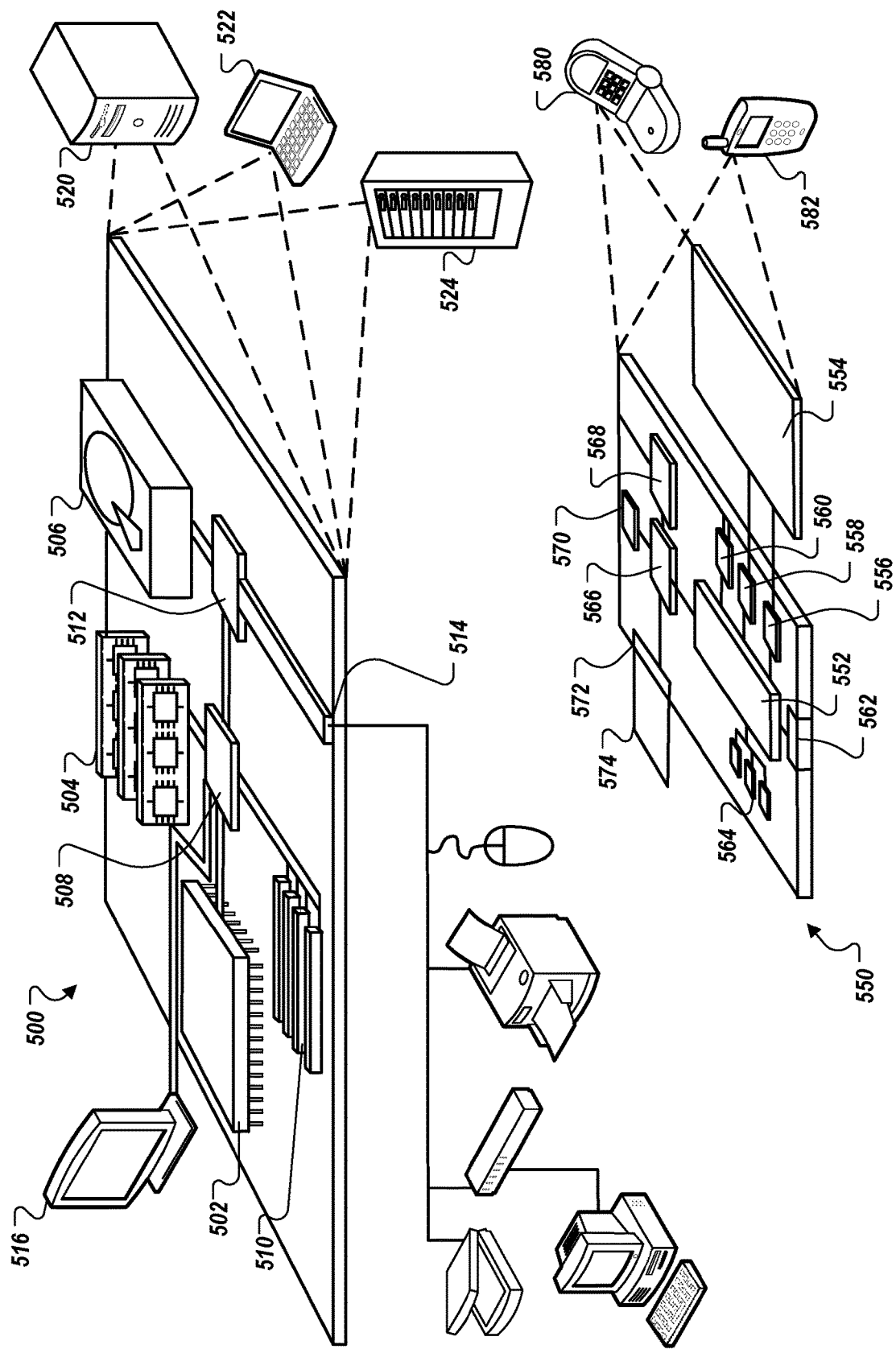
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A system for determining reliable location data using messages with unreliable location data, the system comprising:
   one or more processors;
   memory storing instructions that, when executed by the processors, cause the processors to perform operations comprising:
   determining, for each of a plurality of logistic addresses using a representative point of the logistic address, a logistic-geohash that comprises a first plurality of digits, the digits being arranged in sequence identifying progressively more granular geographic areas;
   accessing records of data messages, each data message including a geographic locator and a sender-identifier;
   for each sender-identifier, determining one or more geogroups, each geogroup identifying data messages originating near each other geographically;
   for each geogroup:
   determining a representative point of the geogroup to represent the geogroup;
   determining, using the representative point of the geogroup, a geogroup-geohash that comprises a second plurality of digits, the digits being arranged in sequence identifying progressively more granular geographic areas;
   identifying pairs of geogroup:logistic address based on a matching of at least some of the first plurality of digits and some of the second plurality of digits;
   for each pair of geogroup:logistic address, determining a distance between the representative point of the geogroup and the representative point of the logistic address;
   selecting one or more of the geogroup:logistic address pairs; and
   storing in the computer memory, for later access, the selected geogroup:logistic address pairs as representing a logistic location of the sender-identifier of the messages of the geogroup.

2. The system of claim 1, wherein the sender-identifier is one of the group comprising internet protocol (IP) address, digital household identifier, and user identifier.

3. The system of claim 1, wherein determining the geogroups comprises identifying connected components in a graph created using geographic locators as vertices and distances between geographic locators as edges.

4. The system of claim 3, wherein the graph is assembled using only geographic locators within a threshold distance of a landmark.

5. The system of claim 1, wherein determining the geogroups comprises identifying clusters using a clustering analysis.

6. The system of claim 1, wherein the representative points of geogroups are centroids of a shape containing the geographic locators of the corresponding identified data messages.

7. The system of claim 6, wherein the centroids are found using a marginal median analysis.

8. The system of claim 1, wherein the logistic address is one of the group comprising a mailing address, a building identifier, and a land parcel identifier.

9. The system of claim 1, wherein identifying pairs of geogroup:logistic address based on a matching of at least some of the first plurality of digits and some of the second plurality of digits comprises:
   generating a result table by joining a first table and a second table on N most significant digits in geohashes, the geohashes comprising more than N digits;
   the first data table comprising entries that each record at least a logistic address and an associated logistic-geohash; and
   the second data table comprising entries that each record at least a geogroup identifier and an associated geogroup-geohash.

10. The system of claim 1, the operations further comprising initiating a computational process for a user associated with a particular sender-identifier using at least one of the selected geogroup:logistic address pairs as representing a logistic location of the sender-identifier of the messages of the geogroup.

11. A method of determining reliable location data using messages with unreliable location data, the method comprising:
   determining, for each of a plurality of logistic addresses using a representative point of the logistic address, a logistic-geohash that comprises a first plurality of digits, the digits being arranged in sequence identifying progressively more granular geographic areas;
   accessing records of data messages, each data message including a geographic locator and a sender-identifier;
   for each sender-identifier, determining one or more geogroups, each geogroup identifying data messages originating near each other geographically;
   for each geogroup:
   determining a representative point of the geogroup to represent the geogroup;
   determining, using the representative point of the geogroup, a geogroup-geohash that comprises a second plurality of digits, the digits being arranged in sequence identifying progressively more granular geographic areas;
   identifying pairs of geogroup:logistic address based on a matching of at least some of the first plurality of digits and some of the second plurality of digits;
   for each pair of geogroup:logistic address, determining a distance between the representative point of the geogroup and the representative point of the logistic address;
   selecting one or more of the geogroup:logistic address pairs; and
   storing in computer memory, for later access, the selected geogroup:logistic address pairs as representing a logistic location of the sender-identifier of the messages of the geogroup.

12. The method of claim 11, wherein the sender-identifier is one of the group comprising internet protocol (IP) address, digital household identifier, and user identifier.

13. The method of claim 11, wherein determining the geogroups comprises identifying connected components in a graph created using geographic locators as vertices and distances between geographic locators as edges.

14. The method of claim 13, wherein the graph is assembled using only geographic locators within a threshold distance of a landmark.

15. The method of claim 11, wherein determining the geogroups comprises identifying clusters using a clustering analysis.

16. The method of claim 11, wherein the representative points of geogroups are centroids of a shape containing the geographic locators of the corresponding identified data messages.

17. The method of claim 16, wherein the centroids are found using a marginal median analysis.

18. The method of claim 11, wherein the logistic address is one of the group comprising a mailing address, a building identifier, and a land parcel identifier.

19. The method of claim 11, wherein identifying pairs of geogroup:logistic address based on a matching of at least some of the first plurality of digits and some of the second plurality of digits comprises:
- generating a result table by joining a first table and a second table on N most significant digits in geohashes, the geohashes comprising more than N digits;
- the first data table comprising entries that each record at least a logistic address and an associated logistic-geohash; and
- the second data table comprising entries that each record at least a geogroup identifier and an associated geogroup-geohash.

20. The method of claim 11, the method further comprising initiating a computational process for a user associated with a particular sender-identifier using at least one of the selected geogroup:logistic address pairs as representing a logistic location of the sender-identifier of the messages of the geogroup.

\* \* \* \* \*